United States Patent [19]

Amaya

[11] Patent Number: 4,723,053
[45] Date of Patent: Feb. 2, 1988

[54] CABLE CLOSURE WITH STRAIN RELIEF DEVICE

[75] Inventor: Mauricio Amaya, Roselle, Ill.

[73] Assignee: Reliance Electric Company, Cleveland, Ohio

[21] Appl. No.: 888,253

[22] Filed: Jul. 21, 1986

[51] Int. Cl.$^4$ .................. H02G 7/08; H02G 15/133; H01R 13/585; F16G 11/04
[52] U.S. Cl. .................. 174/41; 24/132 R; 24/135 K; 24/136 R; 174/135; 403/21; 403/344; 403/369
[58] Field of Search .............. 174/41, 135, 146, 154, 174/155; 339/103 R, 103 C, 107; 24/114.5, 132 R, 132 WL, 135 R, 135 K, 136 R, 136 L; 59/86; 285/367, 411; 403/7, 21, 344, 367, 368, 369, 371

[56] References Cited

U.S. PATENT DOCUMENTS

| | | | |
|---|---|---|---|
| 309,784 | 12/1884 | Hubbard | 403/344 |
| 876,138 | 1/1908 | Blum et al. | 24/136 R |
| 1,229,408 | 6/1917 | Bullum | 24/136 R |
| 1,992,284 | 2/1935 | Banks | 174/155 |
| 2,010,853 | 8/1935 | Dyer | 59/86 |
| 2,538,043 | 1/1951 | Roy et al. | 403/369 X |
| 3,153,693 | 10/1964 | Baxter et al. | 174/41 X |
| 3,846,575 | 11/1974 | Troy | 174/41 |

FOREIGN PATENT DOCUMENTS

| | | | |
|---|---|---|---|
| 2810695 | 9/1979 | Fed. Rep. of Germany | 174/146 |
| 7255 | of 1904 | United Kingdom | 403/344 |
| 15757 | of 1904 | United Kingdom | 403/344 |
| 163340 | 6/1921 | United Kingdom | 24/136 R |
| 892423 | 3/1962 | United Kingdom | 174/146 |

*Primary Examiner*—Laramie E. Askin
*Attorney, Agent, or Firm*—Trexler, Bushnell, Giangiorgi & Blackstone, Ltd.

[57] ABSTRACT

A strain relief device for resisting strain forces acting in a direction of pull-out of a cable relative to a cable closure, comprises a cable gripping member having at least two complementary jaw-like segments alignable for defining therebetween a tubular through opening sized for gripping a cable of a given diameter therewithin and an outer surface of predetermined configuration. These jaw-like segments have interengageable edge surfaces for defining a maximum inwardly compressed condition of the through opening corresponding to a predetermined limited maximum compression of the given diameter of cable for substantially preventing damage thereto. A generally annular locking member comprises a pair of locking segments defining an inner surface formed for complementary surrounding engagement with the gripping member outer surface and coupling structure for releasably coupling the locking segments together about the gripping member to retain the same in gripping engagement with the cable.

16 Claims, 7 Drawing Figures

U.S. Patent  Feb. 2, 1988  Sheet 1 of 2  4,723,053
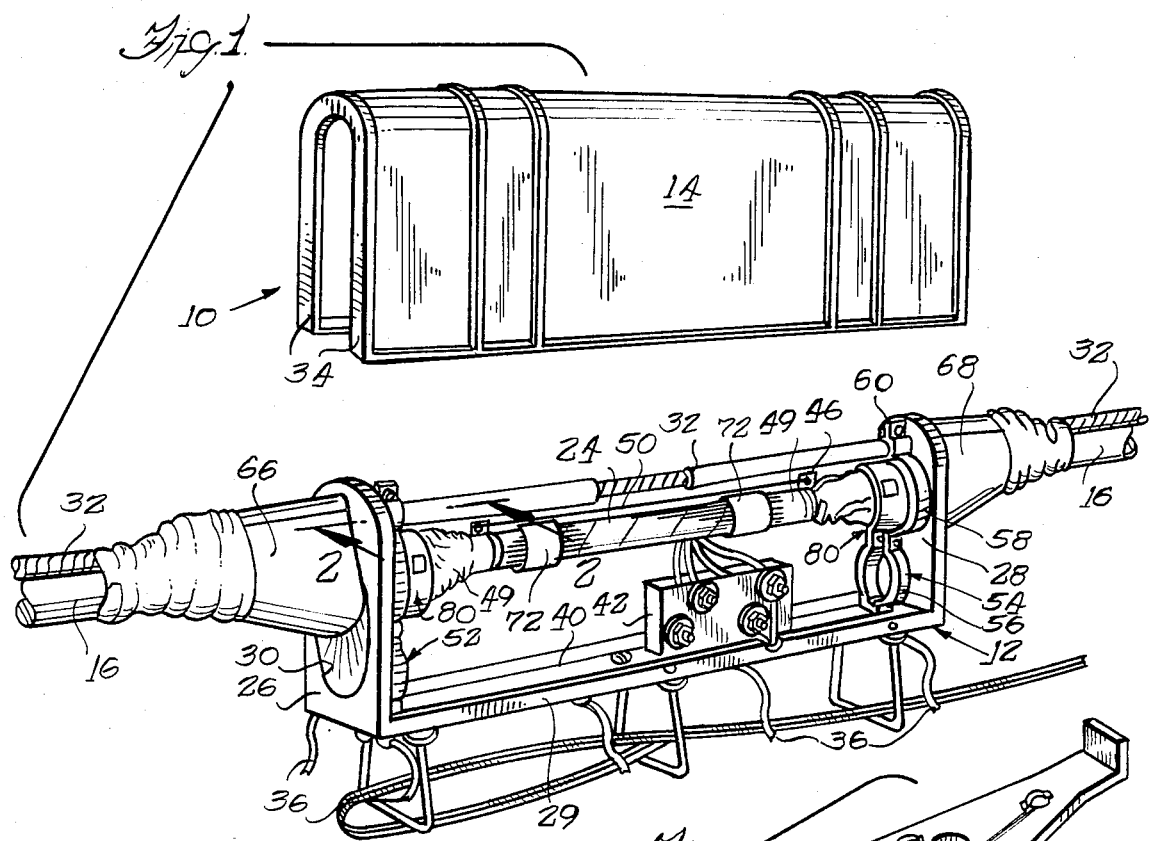
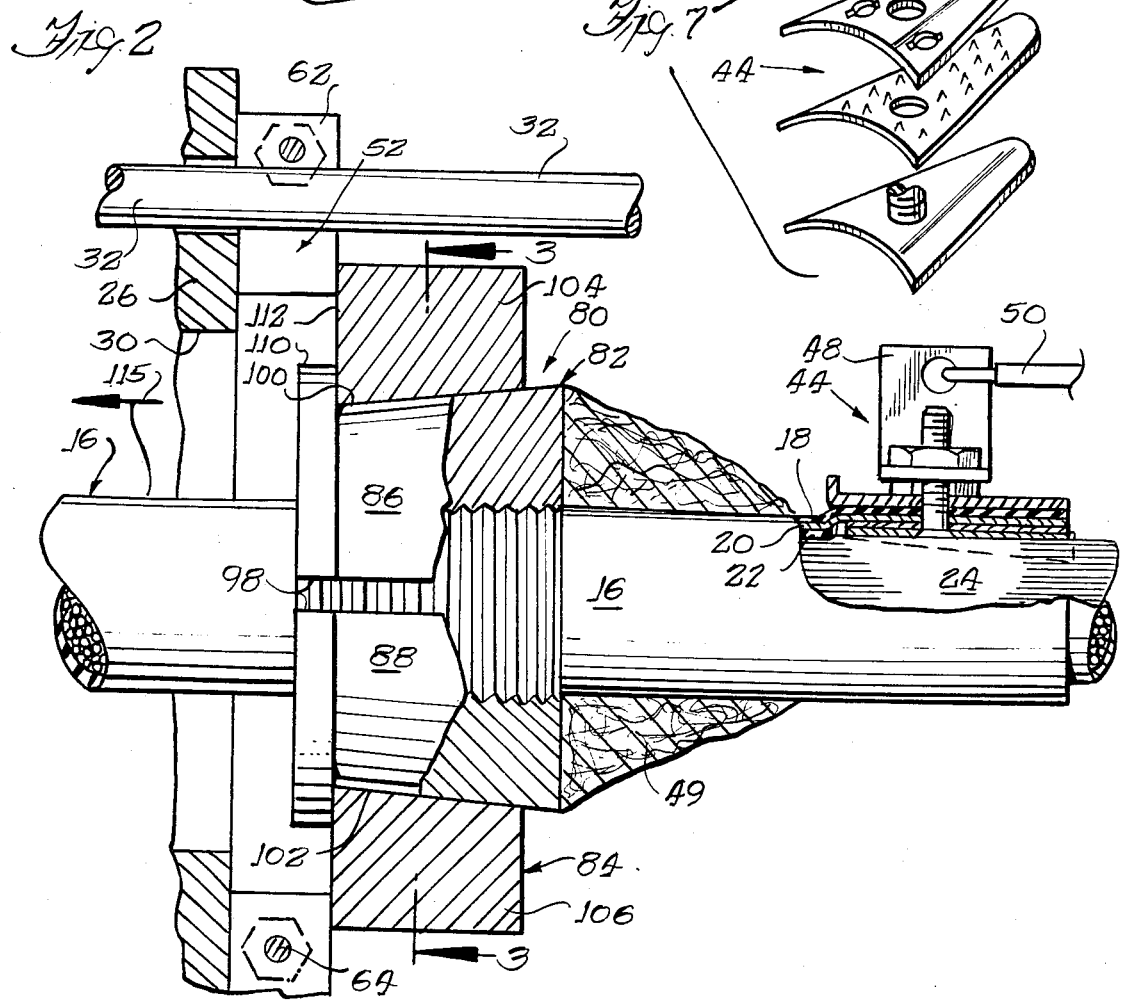

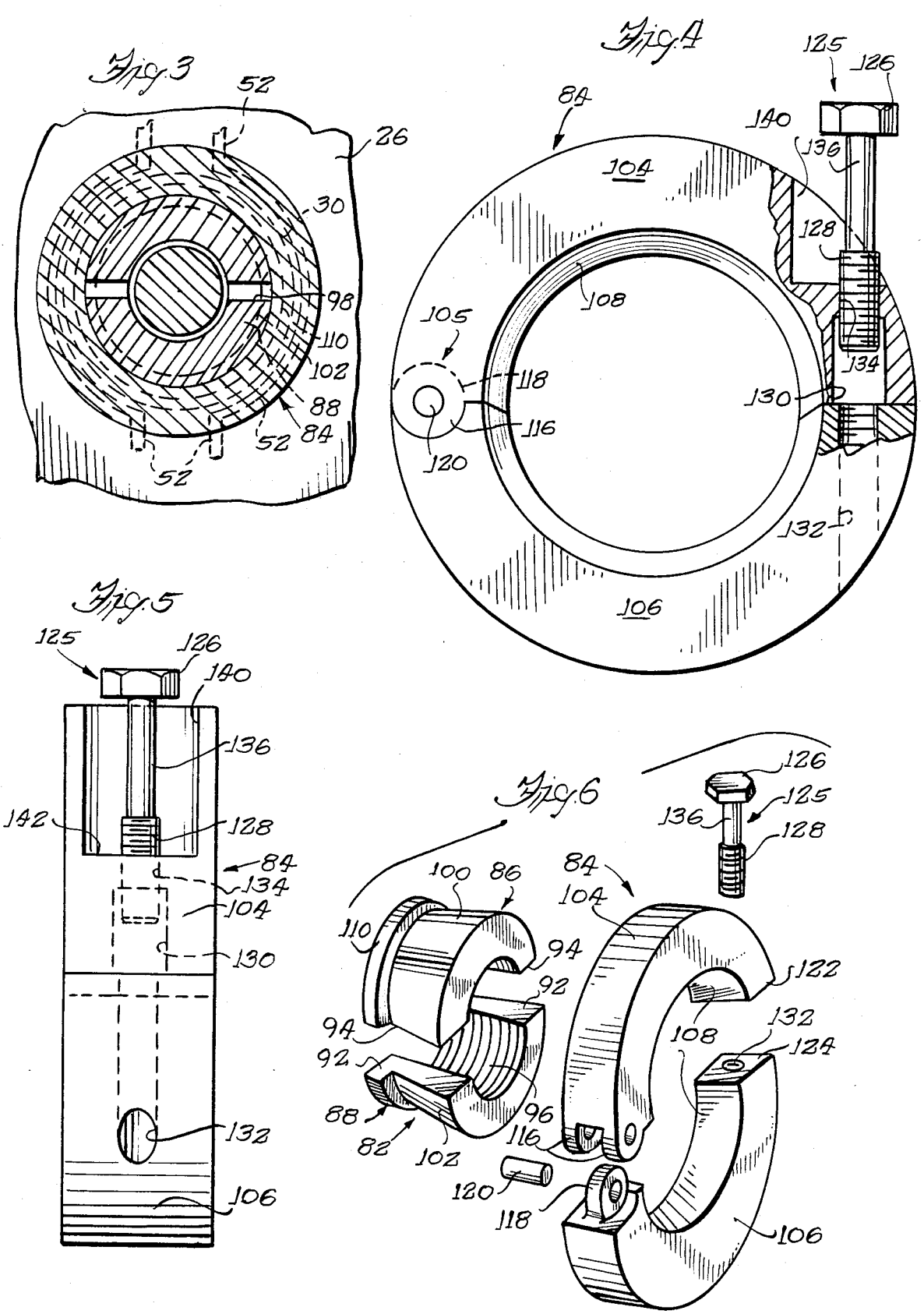

CABLE CLOSURE WITH STRAIN RELIEF DEVICE

BACKGROUND OF THE INVENTION

This invention relates generally to cable closures and more particularly to a novel and improved device for relieving strain on the cables enclosed within such closures.

Cable closures are used in the telecommunications industry for a broad variety of purposes. Generally speaking, such closures are used for terminating or bringing out selected wire pairs from a cable to one or more terminal blocks within the closure. In a telephone cable, such a closure may be provided at the point where one or more pairs on the cable are spliced to the pairs connected to a subscriber.

One particularly advantageous type of closure is generally known as the ready access type and is illustrated for example in U.S. Pat. Nos. 3,153,693 to Baxter et al, issued Oct. 20, 1964, and 3,846,575 to Troy, issued Nov. 5, 1974. In these types of closures, the telephone cables enter and leave through tapered guide members generally known in the art as nozzles. Suitable insulating tape is wrapped around the end of each nozzle to form a waterproof seal. Such closures also receive therethrough a so-called messenger cable which acts as a structural support member for the telephone cable. Additionally, such closures also generally include gripping clamp-like or bracket members for grippingly engaging both the messenger cable and telephone cable to properly maintain the position of the latter relative to the former within the closure.

Such ready access closures have heretofore been used primarily in connection with telephone cables carrying only voice communications. However, it is now becoming more common for such closures to be utilized in connection with cables for carrying electronic data communications or television signals. For such signals, the continuity and integrity of the grounding shield of the cable is quite important.

In this latter regard, it has been found that the strain or pull-out forces experienced at the respective ends of cables entering the closure often causes these cables gradually to work out of the gripping clamps or brackets. It should be recognized that the exterior grounding shield is generally removed from the cable within the closure to permit access to the line pairs to be brought out in the closure. Accordingly, suitable terminal clips or other devices are utilized to grip the severed grounding shield at either end of the cable and a jumper wire or cable used to carry the ground across the closure. However, upon such slipping of the cables relative to the clamps, the continuity of this ground is often disrupted. Moreover, the cable ends may actually come out of the nozzle, thereby breaking the waterproof seal.

It is therefore desirable that the strain on the cable be relieved. It is also desirable that such strain relief be provided in such a manner that the insulation on the cable pairs is not damaged and, particularly, such that the grounding shield and line pairs themselves within the cable are not damaged. Hence, while placing a hose clamp or similar clamping device over the nozzle may provide some strain relief, over-tightening of such clamps can cause undesired damage to the various parts of the cable. Such damage may seriously compromise the ability of the cable to properly carry electronic data communications or television signal.

Moreover, it is desirable that any strain relief arrangement provided can be relatively simply and inexpensively retrofitted on existing installations.

OBJECTS OF THE INVENTION

Accordingly, it is a general object of the invention to provide a novel and improved strain relief device for cable closures.

A more particular object is to provide a strain relief device which provides the desired strain relief for the cable without damaging the cable or any part thereof.

A further object is to provide a strain relief device in accordance with the foregoing objects which may be readily retrofitted on an existing installation with but a minimum of labor and expense.

A related object is to provide a strain relief device in accordance with the foregoing objects which is relatively simple and inexpensive in its design and manufacture and yet highly reliable in operation.

BRIEF DESCRIPTION OF THE DRAWINGS

The features of the present invention which are believed to be novel are set forth with particularity in the appended claims. The organization and manner of operation of the invention, together with further objects and advantages thereof, may best be understood by reference to the following description taken in connection with the accompanying drawings in the several figures of which like reference numerals identify like elements, and in which:

FIG. 1 is a partially exploded perspective view illustrating a cable closure or ready access unit in connection with which the strain relief device in accordance with the invention is advantageously utilized;

FIG. 2 is a greatly enlarged partial sectional view taken generally in the plane of the line 2—2 of FIG. 1;

FIG. 3 is a partial sectional view taken generally in the plane of the line 3—3 of FIG. 2;

FIG. 4 is an enlarged elevational view, partially broken away and partially in section, of a locking member or portion of the strain relief device of the invention;

FIG. 5 is an end elevational view of the locking member of FIG. 4;

FIG. 6 is a somewhat reduced, exploded perspective view illustrating the parts of the strain relief device of the invention; and FIG. 7 is an exploded perspective view of an inner sheath clamp member.

DETAILED DESCRIPTION OF THE ILLUSTRATED EMBODIMENT

Referring now to the drawings and initially to FIG. 1, there is shown a ready access type of closure 10 generally of the same type illustrated in the above-referenced U.S. Pat. No. 3,846,575 but embodying the improvement of the present invention. The closure 10 includes a base 12 and a cover 14, the latter here being shown exploded to reveal further details of the interior of the closure. This closure is intended for a communication cable 16, such as a telephone cable, having a number of individual insulated wires therein.

Typically, and as best seen in FIG. 2, the cable includes an outer plastic jacket 18 that surrounds a metallic grounding shield 20 which in turn surrounds an inner plastic core wrapper 22. A bundle of individual insulated cable wires 24 are confined within this inner core wrapper 22.

The base 12 of the closure includes a generally U-shaped structure having spaced apart ends 26, 28 that are joined at their bottom edges by an elongate bottom wall or member 29. The ends 26, 28 have through openings 30 to receive the cable 16 as well as a cable-supporting strand or messenger 32 as it is known in the art. The cover 14 is a downwardly opening U-shaped member having marginal in-turned flanges 34 at its opposite ends and along its longitudinal margins for fitting around and about the outside surfaces of the ends 26, 28 and bottom wall 29. Spring wire cover locks 36 are provided for releasably gripping the sides of the cover 14 to retain the cover and base assembly together.

On the inside surface of wall 29 is mounted an elongate metallic strap 40 that runs the length thereof. Mounted to the strap 40 is a dielectric terminal block 42. It should be understood that more than one terminal block such as block 42 may be mounted to the strap, depending on the number of wires which are to be brought out from the cable 16. The remaining wires of the cable which are not to be brought out at one or more terminal blocks 42 simply continue without interruption through the closure.

In this latter regard, it will be noted that the outer jacket 18 and metallic grounding shield 20 are removed from the part of the cable 16 that is within the closure, in order that access may be had to the cable wires to be brought out to terminal block 42. Accordingly, an arrangement is also provided for restoring the continuity of the grounding shield between the interrupted ends thereof. This arrangement includes a respective pair of inner sheath clamp members 44, 46 which are arranged as best viewed in FIG. 2 for grippingly engaging the respective separate, severed ends of the sheath 18 and shield 20. These clamps 44, 46 are of metallic material and each has a metallic terminal or strap member 48, between which is connected a conductor 50. Hence, the ground path is completed between the clamps 44 by conductor 50 so as to restore the continuity of the ground across the closure. Additional insulating tape wrappings 49 are preferably provided around the clamps 44 and 46 to complete installation thereof as shown in FIG. 1.

The base member or assembly 12 is initially provided with brackets or clamps 52, 54 for securing the strap 40 and terminal block or blocks 42 thereon, as well as the portion of cable 16 within the closure, in a fixed position relative to the cable supporting messenger strand 32. To this end, each clamp includes a rigid base portion 56 secured to the strap 40 and respective gripping portions 58, 60 which are secured respectively to the cable 16 and messenger 32. These gripping portions are preferably generally arcuately formed complementary halves of the respective clamps. The gripping portions are provided with transversely mounted threaded fasteners 62, 64 for securing the said halves together and tightening the halves to the desired degree to secure the clamps together about the cable 16 and messenger 32 respectively. It will be noted that once so secured, these clamps 52, 54 define a relatively rigid, generally rectilinear frame-like structure comprised of the messenger 32, and the strap 40 and the two clamps 52, 54.

Respective nozzles or nozzle-like members 66, 68 are preferably installed about the cable 16 where it enters the end walls 26, 28 for closing off the openings 30. An additional tape wrap 70 may be disposed around the outer end of each nozzle and the adjacent stretch of cable and messenger. Also, a part of the cable within the closure may be of short tape wraps 72 to hold the wires bundled together. Additional details of the closure of FIG. 1 are described in the above-referenced U.S. Pat. No. 3,846,575 to which reference is invited; however, such additional details are not necessary to an understanding of the present invention. Moreover, it should be understood that the foregoing ready access closure comprises no part of the invention, and that the invention may be readily utilized with closures of a different type without departing from the invention.

Referring now to the remaining drawing figures, the invention advantageously provides a strain relief device designated generally by the reference numeral 80 for resisting strain forces acting in the direction of pull-out of the cable 16 relative to the closure 10. In the illustrated embodiment, two such strain relief devices 80 are utilized, whereby only one need be described in detail. These strain relief devices are positioned immediately axially inwardly of the respective clamps 52, 54 as shown in FIG. 1.

In this regard, it should be appreciated that it is important to limit or resist axial strain on the cable 16, in order to preserve both the integrity of the respective individual conductors in the cable as well as to maintain the integrity and continuity of the ground, and especially of the ground continuation conductor 50 which might be damaged or destroyed by excessive strain on the cable. That is, axially outwardly acting pulling forces which may be experienced by the cable 16 to either axial end of the closure 10 must be resisted, so as to avoid damage to the portions of the cable 16 within the closure 10.

Generally speaking, the strain relief device 80 comprises a first, interior or cable-gripping member or jaws designated generally by reference numeral 82, and a second, outer or locking member or collar designated generally by the reference numeral 84. The inner or gripping member is a segmented member having at least two complementary jaw-like gripping segments 86, 88 which, in the illustrated embodiment, are substantially identical and oppositely disposed members. These gripping jaw segments 86 and 88 define therebetween a generally tubular through opening sized for gripping a cable such as the cable 16 of a given diameter. That is, the strain relief device in accordance with the invention, and in particular the gripping jaws 86 and 88 will be provided in a plurality of sizes corresponding generally to a plurality of different but usually standard cable sizes on which it is to be installed. Advantageously, the segments are provided with respective facing similar flat edge stop or abutment surfaces 92—92 and 94—94 which, when engaged, define a maximum inwardly compressed movement or condition of the gripping member 82 and of the through opening therein. This maximum inward movement corresponds to a predetermined, limited maximum degree of compression of the given diameter of cable for which the opening and gripping member 82 are sized, while substantially preventing damage to this cable. More specifically, the gripping jaws are preferably made for each cable size so as to squeeze or compress by approximately 0.032 inch to 0.047 inch the nominal cable diameter and to thereafter stop squeezing or compressing the cable any further so as to prevent any possible damage to the inner conductors of the cable.

Preferably, in this regard, the jaws are provided with a plurality of serrations 96 which extend into the opening defined therebetween. These serrations 96 further aid in facilitating positive gripping of the cable 16 and particularly of the plastic outer sheath 18 thereof without substantially compressing the inner conductors 24. Preferably, as indicated in FIG. 2, some gap or opening 98 will remain between the facing stop or abutment surfaces 92—92 and 94—94 of the jaws upon initial installation thereof.

Advantageously, the outer surfaces of the respective jaws 86 and 88 are tapered as indicated by reference numerals 100, 102. Preferably, this taper defines a generally frusto-conical outer surface 100, 102 of the gripping member.

Cooperatively, the locking member or collar 84 comprises a generally annular member, preferably constructed of a pair of similar, semi-annular locking segments or halves 104, 106. These locking segments 104 and 106 advantageously define an inner surface 108 formed for complementary surrounding engagement with the gripping member outer surface 100, 102. Hence, in the illustrated embodiment, the surface 108 is also tapered and preferably substantially frusto-conical in form. The minimum diameter of surface 108 is preferably somewhat greater than the minimum diameter of surface 100, 102 to permit the slight gapping apart indicated at reference numeral 98 of FIG. 2 at least upon initial assembly. However, the maximum diameter of inner surface 108 is preferably somewhat less than the maximum diameter of outer surface 100, 102 so as to prevent the latter from being completely pulled therethrough.

Additionally, in order to define full advancement of the locking member or collar 84 with respect to the minimum diameter end of gripping member 82, the latter is provided with an additional radially outwardly extending stop or abutment member or surface 110. In the illustrated embodiment, this stop or abutment surface 110 comprises a generally annular collar extending completely around the outer surface 100, 102 at the minimum diameter end thereof.

As indicated in FIG. 2, the strain relief device 80 is engaged with the cable oriented such that the tapered surfaces generally converge in the direction of strain forces or pull-out forces experienced in the cable, as generally indicated by arrow 115. Moreover, the device 80 is preferably engaged with the cable inwardly of an abutment surface defined by the axially inner surface of each of clamps 52, 54, such that a substantially flat, annular end surface 112 surrounding the minimum diameter end of collar or locking member 84 faces and abuts clamp 52. This abutment or engagement thereby further resists the pull-out or strain forces 115 on the cable 16.

In operation, it will be seen that the respective jaws 86, 88 may be readily affixed placed about the cable 16 within the closure relatively simply by hand, without the aid of any tools or the like. Thereupon, the collar or locking member 84 may be readily installed surrounding the jaws 86, 88 and tightened or locked therearound as generally shown in FIGS. 2 and 3. Hence, pulling forces 115 experienced in cable 16 may initially move the cable axially a slight, limited amount, with the jaws 86, 88 being pulled therewith due to the engagement of the teeth or serrations with the cable sheath. However, such pulling will cause the respective engaged frusto-conical surfaces 100, 102 and 108 to push or compress the jaws even more tightly about the cable, tending to close the gap 98. This action resists further movement of the cable and jaws relative to the collar or locking member 84, which it will be remembered abuts the relatively rigid frame member or clamp 52. Hence, as the cable tries to pull out, the taper of the gripping jaws in effect increases the squeezing or compressive force thereof and the jaws also pull on the locking member or collar which is immediately stopped by the frame or clamp 52.

In order to achieve the foregoing application of the locking member or clamp 84 about the jaws 86, 88, the clamp is preferably provided as two substantially similar segments or 104, 106. Advantageously, these halves 104 and 106 are provided with means for coupling together while still permitting ready manual engagement thereof over the jaws. In this regard, the coupling means provided include hinge means 105 for hingedly joining the two halves so as to open and close about the jaws. This hinge means is defined by respective complementary hinge knuckle-like portions 116, 118 formed on respective facing ends of the two segments 104, 106 and a suitable hinge pin 120, which is preferably press-fitted therethrough to define a hinge-like connection. The opposite, free ends 122, 124 of the respective segments 104 and 106 are provided with fastener means for releasably engaging the two ends 122, 124 together.

In the illustrated embodiment, the fastener means employed comprises an elongate, threaded bolt-like fastener 125 which includes an enlarged head 126 and a threaded shank portion 128. Cooperatively, the segment end 122 has a through bore 130 for receiving the fastener shank 128 therethrough, and the other end 124 has a through bore 132 having a complementary internal thread for engagement with threaded shank 128. Moreover, in the illustrated embodiment, the first through bore 130 includes an initial or leading-in internally threaded portion 134 for engagement with threaded shank 128 so as to thereby retain the threaded fastener 125 therein prior to engagement thereof with the internal thread 132 of the opposite end.

Cooperatively, in this regard, the fastener 125 further preferably has a reduced diameter unthreaded shank portion 136 intermediate the head and threaded shank portion to define captive engagement thereof with the first segment end portion, once the threads are advanced with respect to complementary internal threads 134. Accordingly, the locking member may be readily hingedly opened for engagement over and about jaws 86 and 88, immediately following placement thereof at the desired position relative to cable 16. Thereafter, the segments 104, 106 are hingedly closed together, and the captive fastener 125 advanced to hold the two segment ends 122, 124 tightly together, completing closure thereof about jaws 86, 88.

Preferably, a further enlarged bore or opening 140 is also provided in segment 104 immediately prior to threaded bore 134. This provides an enlarged area 142 for engagement with the head 126 of the bolt or fastener 125 and also permits access to the head 126 by a suitable tool or the like for rotation of the same for advancement or retraction.

While particular embodiments of the invention have been shown and described in detail, it will be obvious to those skilled in the art that changes and modifications of the present invention, in its various aspects, may be made without departing from the invention in its broader aspects, some of which changes and modifications being matters of routine engineering or design, and others being apparent only after study. As such, the scope of the invention should not be limited by the particular embodiment and specific construction described herein but should be defined by the appended claims and equivalents thereof. Accordingly, the aim in the appended claims is to cover all such changes and modifications as fall within the spirit and scope of the invention.

The invention is claimed as follows:

1. In a cable closure of the type to be supported from a messenger strand and for receiving a cable suspended from the messenger strand, the cable closure including means for clamping to a messenger strand, the improvement comprising a strain relief device for resisting strain forces acting in a direction of pull-out of a cable relative to the cable closure said strain relied device comprising, in combination: a cable gripping member having at least two complementary jaw-like segments alignable for defining therebetween a tubular through opening sized for gripping a cable of a given diameter therewithin, and an outer surface of predetermined configuration; said segments having interenageable edge surfaces for defining a maximum inwardly compressed condition of said through opening corresponding to a gripping of a cable of a given diameter with a predetermined maximum compression and retaining such a cable against pullout but substantially preventing damage thereto; a generally annular locking member comprising a pair of locking segments defining an inner surface formed for complementary surrounding engagement with said gripping member outer surface; and coupling means for releasably coupling said locking segments together about said gripping member to retain the same in gripping engagment with a cable.

2. The combination according to claim 1 wherein said cable closure has means forming an abutment surface for surrounding a cable, wherein said strain relief device when in use is affixed to a cable inwardly of said abutment surface with respect to the direction of strain forces which will act on such cable, and wherein said locking member has a substantially flat, annular end surface for engaging said abutment surface to thereby resist said strain forces.

3. The combinaion according to claim 2 wherein said outer surface of said gripping member is tapered, said gripping member when applied to a cable oriented such that said tapered surface converges in the direction of strain forces applied which will be applied to such a cable, said complementary inner surface of said locking member forming a complementary taper for engaging said tapered outer surface of said gripping member when the same is pulled with a cable in the direction of strain forces on such a cable, thereby forcing said jaw-like segments inwardly for further compressing such a cable and upon engagement of said end surface thereof with said cable closure abutment surface to thereby retain such a cable within the closure against further movement.

4. The combination according to claim 3 wherein both of said tapered surfaces are substantially frusto-conical in form and wherein a maximum inner diameter of said locking member inner surface is less than a maximum outer diameter of said gripping member outer surface, to thereby prevent pulling of the gripping member completely through the locking member in response to strain forces when acting upon a cable.

5. The combination according to claim 3 wherein each of said jaw-like segments has a radially outwardly extending portion about the minimum diameter end of said tapered surface thereupon for engagement with an end surface of said locking member to define full advancement of said locking member with respect thereto in the direction of convergence of said taper.

6. The combination according to claim 5 wherein said radially outwardly extending portion comprises a generally annular rim for engagement with said end surface of said locking member.

7. The combination according to claim 1 wherein said jaw-like segments are substantially identical.

8. The combination according to claim 7 wherein said jaw-like segments are two in number and wherein said interengageable edge surfaces are substantially flat and diametrically aligned for defining said maximum compressed condition thereof when the surfaces come into flat abutting condition.

9. The combination according to claim 1 wherein said through opening of said gripping member has a plurality of serrations therein for further enhancing engagement with a cable.

10. The combination according to claim 1 wherein each of said locking segments comprises a substantially similar, generally semi-annular member and wherein said coupling means comprises means defining hinge means joining one end of each of the respective locking segments, and fastener means for coupling together the opposite ends of each of said locking segments.

11. The combination according to claim 10 wherein said fastener means comprises an elongate threaded fastener having an enlarged head and a threaded shaft and wherein one of said locking segment opposite ends has a through bore for receiving said shaft therethrough and the other of said locking segment opposite ends has a complementary internal thread for engagement with said threaded shaft to thereby pull the two ends together as said fastener is advanced relative to said internal thread.

12. The combination according to claim 11 wherein said through bore also has an internal thread for retaining said threaded fastener therein prior to engagement thereof with the complementary internal thread of the other said locking segment end portion.

13. The combination according to claim 12 wherein said fastener has a reduced diameter unthreaded shank intermediate said head and said threaded shaft so as to define captive engagement thereof with said through bore.

14. The combination according to claim 11 wherein said through bore of said one locking segment opposite end has an enlarged portion for receiving said enlarged head of said threaded fastener seated therewithin upon full advancement thereof to said internal thread of the other of said locking segment opposite end portions and to permit access to said fastener head by a suitable tool for respectively advancing and retracting the same.

15. The combination according to claim 10 wherein said hinge means comprises complementary interfitting hinge knuckles on the ends of the respective locking segments and a hinge pin for hingedly joining the same.

16. In a cable closure of the type to be supported from a messenger strand and for receiving a cable suspended from the messenger strand, the cable closure including means for clamping to a messenger strand, the improvement comprising a strain relief device for resisting strain forces acting in a direction of pull-out of a cable relative to the cable closure, said strain relief device comprising, in combination: a cable gripping member having a jaw structure including segments defining a tubular through opening sized for gripping a cable of a given diameter therewithin, and an outer surface of predetermined configuration; said segments having interengageable edge surfaces for defining a maximum inwardly compressed condition of said through opening corresponding to a gripping of a cable of a given diameter with a predetermined maximum compression for retaining such a cable against pullout but substantially preventing damage thereto; locking means surrounding and engaging said grippin member; and means releasable locking said locking means to said gripping member to retain the same in releasable gripping engagement with a cable.

* * * * *